(12) United States Patent
de Diego

(10) Patent No.: US 8,980,435 B2
(45) Date of Patent: Mar. 17, 2015

(54) CMC COMPONENT, POWER GENERATION SYSTEM AND METHOD OF FORMING A CMC COMPONENT

(75) Inventor: Peter de Diego, Greenville, SC (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 13/252,540

(22) Filed: Oct. 4, 2011

(65) Prior Publication Data

US 2013/0084189 A1    Apr. 4, 2013

(51) Int. Cl.
| | |
|---|---|
| *B32B 9/00* | (2006.01) |
| *B32B 19/00* | (2006.01) |
| *B32B 9/04* | (2006.01) |
| *B32B 13/04* | (2006.01) |
| *B32B 3/00* | (2006.01) |
| *F03B 3/12* | (2006.01) |
| *C04B 37/00* | (2006.01) |
| *F01D 5/28* | (2006.01) |

(52) U.S. Cl.
CPC ............. *C04B 37/001* (2013.01); *C04B 37/005* (2013.01); *F01D 5/282* (2013.01); *F01D 5/284* (2013.01); *C04B 2235/5248* (2013.01); *C04B 2235/5268* (2013.01); *C04B 2235/602* (2013.01); *C04B 2235/614* (2013.01); *C04B 2235/616* (2013.01); *C04B 2237/04* (2013.01); *C04B 2237/341* (2013.01); *C04B 2237/343* (2013.01); *C04B 2237/346* (2013.01); *C04B 2237/36* (2013.01); *C04B 2237/365* (2013.01); *C04B 2237/368* (2013.01); *C04B 2237/38* (2013.01); *C04B 2237/61* (2013.01); *C04B 2237/84* (2013.01); *F05D 2300/6033* (2013.01)

USPC .................... 428/446; 416/241 B; 428/312.6; 428/448; 428/699; 428/701

(58) Field of Classification Search
USPC ........... 416/241 B; 428/446, 448, 312.6, 699, 428/701
See application file for complete search history.

(56) References Cited

U.S. PATENT DOCUMENTS

| | | | | |
|---|---|---|---|---|
| 3,930,085 | A | * | 12/1975 | Pasiuk .......................... 428/116 |
| 4,422,229 | A | * | 12/1983 | Sadler et al. ............. 29/889.721 |
| 5,403,153 | A | | 4/1995 | Goetze |
| 5,643,521 | A | | 7/1997 | Nehm |
| 5,904,972 | A | | 5/1999 | Tunis, III et al. |
| 5,997,077 | A | | 12/1999 | Siebels et al. |

(Continued)

FOREIGN PATENT DOCUMENTS

| | | |
|---|---|---|
| EP | 1262801 A1 | 12/2002 |
| EP | 1749971 A2 | 2/2007 |

OTHER PUBLICATIONS

Search Report and Written Opinion from EP Application No. 12186824.4 dated Jan. 17, 2013.

(Continued)

*Primary Examiner* — Jonathan Langman
(74) *Attorney, Agent, or Firm* — McNees Wallace & Nurick LLC

(57) ABSTRACT

A ceramic matrix composite component for a power generation system includes a ceramic foam core and a ceramic matrix composite material surrounding at least a portion of the ceramic foam core. The ceramic foam core remains in place during operation of the component in the power generation system. Additionally, a method of forming the ceramic matrix composite component is provided.

20 Claims, 5 Drawing Sheets

(56) References Cited

U.S. PATENT DOCUMENTS

| | | |
|---|---|---|
| 6,274,078 B1 | 8/2001 | Dunyak et al. |
| 6,280,550 B1 | 8/2001 | Steibel et al. |
| 6,441,341 B1 | 8/2002 | Steibel et al. |
| 6,607,358 B2 * | 8/2003 | Finn et al. .............. 416/224 |
| 6,627,019 B2 | 9/2003 | Jarmon et al. |
| 7,094,021 B2 | 8/2006 | Haubert |
| 7,229,254 B2 | 6/2007 | Bast et al. |
| 7,343,960 B1 | 3/2008 | Frasier et al. |
| 7,438,655 B2 | 10/2008 | Garcia |
| 7,753,654 B2 | 7/2010 | Read et al. |
| 7,757,808 B1 | 7/2010 | Vaz et al. |
| 7,765,790 B2 | 8/2010 | Clay et al. |
| 7,950,234 B2 | 5/2011 | Radonovich et al. |
| 2005/0118369 A1 | 6/2005 | Kennedy |
| 2011/0027098 A1 | 2/2011 | Noe et al. |
| 2011/0180032 A1 | 7/2011 | Mungas et al. |

OTHER PUBLICATIONS

Search Report from EP Application No. 12186824.4 dated Feb. 11, 2014.

* cited by examiner

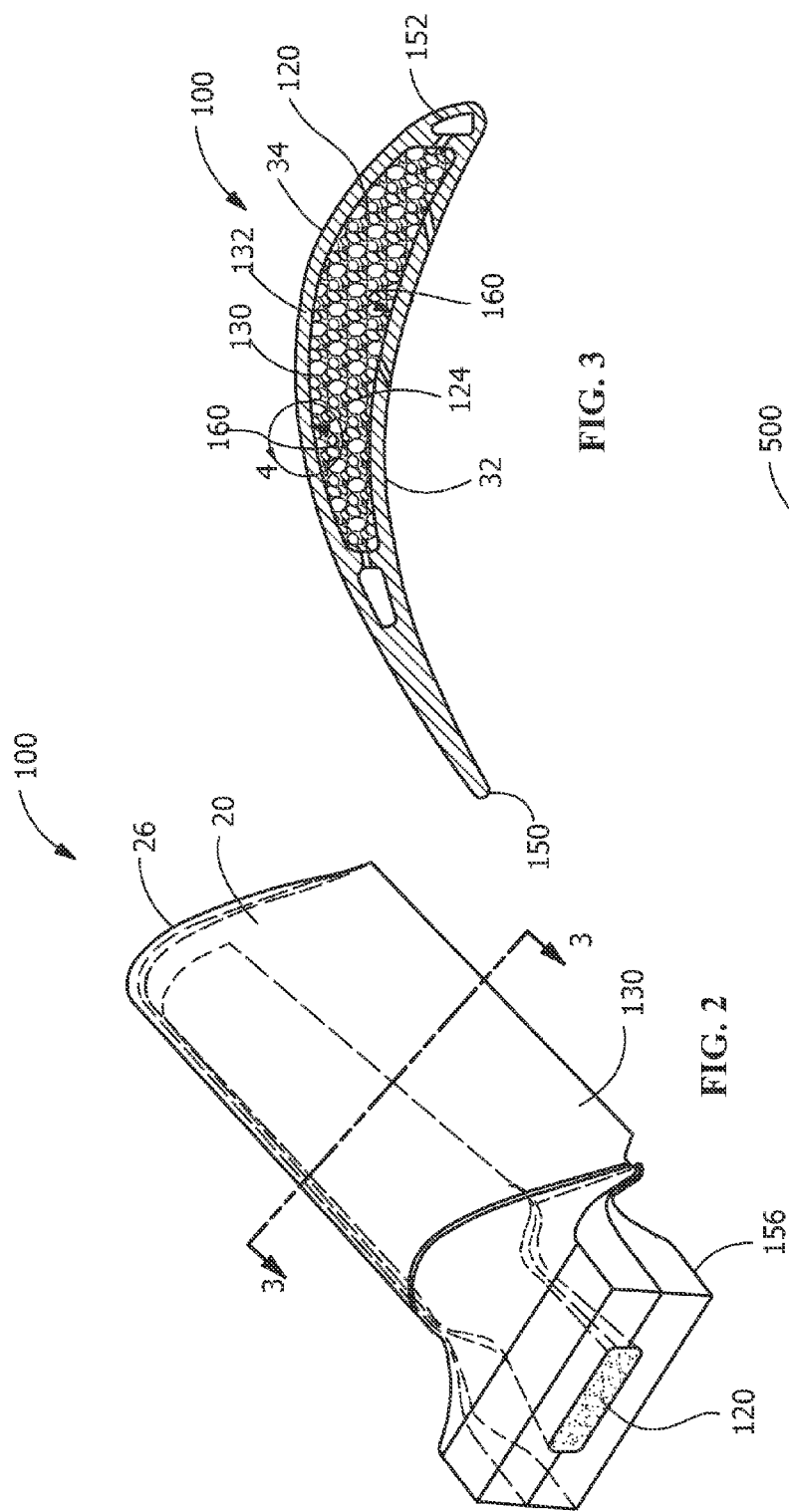
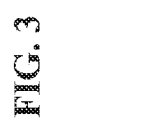
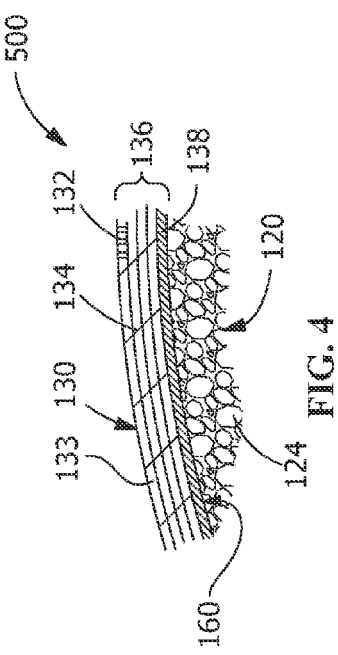

US 8,980,435 B2

CMC COMPONENT, POWER GENERATION SYSTEM AND METHOD OF FORMING A CMC COMPONENT

FIELD OF THE INVENTION

The present invention relates generally to power generation systems and more specifically to ceramic matrix composite components for power generation systems.

BACKGROUND OF THE INVENTION

Silicon carbide (SiC)-based ceramic matrix composite (CMC) materials have been proposed as materials for certain components of gas turbine engines, such as the turbine blades and vanes. Various methods are known for fabricating SiC-based CMC components, including melt infiltration (MI), chemical vapor infiltration (CVI) and polymer pyrolysis (PIP) processes. Though these fabrication techniques significantly differ from each other, each involves the use of tooling or dies to produce a near-net-shape part through a process that includes the application of heat at various processing stages. As with turbine blades and vanes formed of more conventional superalloy materials, CMC blades and vanes are primarily equipped with cavities and cooling passages for two main reasons one to reduce weight which reduces centrifugal load and secondly to reduce their operating temperatures. These features are typically formed in CMC components using a combination of removable and expendable tooling.

The external contours of hollow CMC components are typically formed using removable tooling that can be reused in most cases. Internal cavities can also be formed using removable tooling, though conventional silica ($SiO_2$) and alumina ($Al_2O_3$) cores widely used with investment casting methods that have also been used.

Silica and alumina cores require removal with a leaching compound, including salts, hydrogen fluoride (HF) and alkalis such as sodium hydroxide (NaOH) and potassium hydroxide (KOH). In some cases, the exposed surfaces of a metal investment casting are coated with a masking material to prevent surface attack by the leaching compound—the internal surfaces of the casting cannot be masked due to the presence of the core. As a result, the critical external surfaces of the casting are protected, while less critical internal surfaces are subject to mild attack by the leaching compound. However, leaching compounds conventionally used to remove silica cores from investment castings aggressively attack many CMC materials, and particularly those (that contain silicon and boron, typically in the form of SiC and boron nitride (BN), respectively. Accordingly, attempts to remove silica cores from CMC components susceptible to attack by leaching compounds suffer unacceptable attack of its internal surfaces, which reduces the structural integrity of the CMC component.

Therefore, a CMC component and a method of forming a ceramic matrix composite for a power generation systems that do not suffer from the above drawbacks is desirable in the art.

SUMMARY OF THE INVENTION

According to an exemplary embodiment of the present disclosure, a ceramic matrix composite (CMC) component for a power generation system is provided. The CMC component includes a ceramic foam core and a ceramic matrix composite (CMC) material surrounding at least a portion of the ceramic foam core. The ceramic foam core remains in place during operation of the component.

According to another exemplary embodiment of the present disclosure, a power generation system is provided. The power generation system includes a turbine blade. The turbine blade includes a ceramic foam core and a ceramic matrix composite material surrounding at least a portion of the ceramic foam core. The ceramic foam core remains in place during operation of the component in the power generation system.

According to another exemplary embodiment of the present disclosure a method of forming a ceramic matrix composite component is provide. The method includes providing a ceramic foam core, the ceramic foam core material having a predetermined geometry. The method includes applying a reinforcing layer to the ceramic foam core. The method includes impregnating the reinforcing layer with a matrix material. The method includes curing the ceramic foam core, reinforcing layer and matrix material to form the ceramic matrix composite component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a perspective view of an assembled component having a ceramic foam core of the present disclosure.

FIG. 3 is a cross-sectional view along line 2-2 of FIG. 2 of the component of the present disclosure.

FIG. 4 is an enlarged view of the pre-processed component of the present disclosure.

Wherever possible, the same reference numbers will be used throughout the drawings to represent the same parts.

DETAILED DESCRIPTION OF THE INVENTION

Provided is a CMC component, power generation system and method of forming a CMC component that do not suffer from the drawbacks in the prior art. CMC components, according to the present disclosure minimize or eliminate the limiting aspects of CMC material properties and manufacturing constraints and improve the mechanical loading capability. An embodiment of the disclosure is shown in FIGS. 2 and 3, but the present disclosure is not limited to the illustrated structure.

Figure 1:
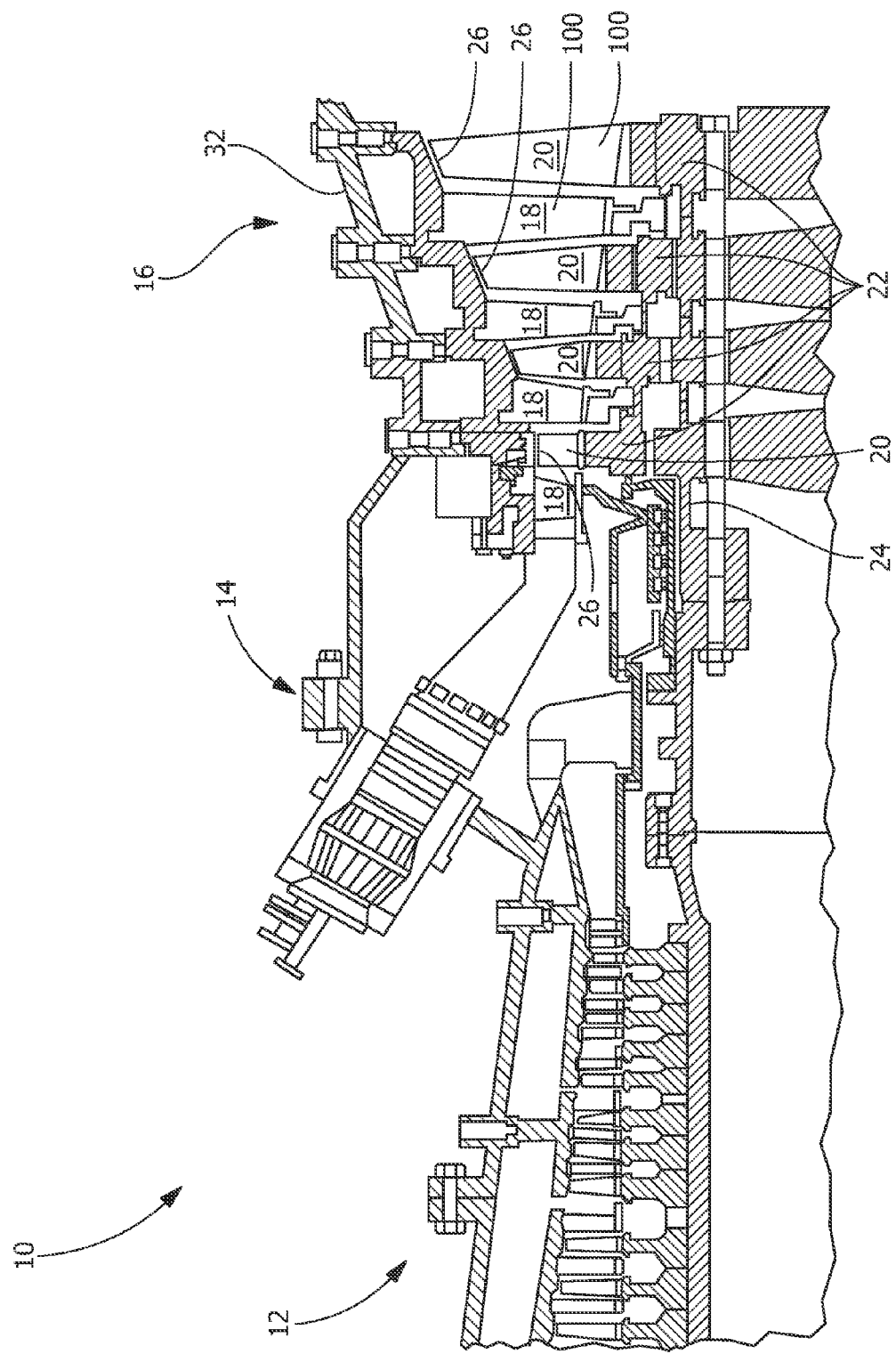
FIG. 1 is a schematic of a power generation system of the present disclosure.

Power generation systems include, but are not limited to, gas turbines, steam turbines, and other turbine assemblies. FIG. 1 shows an example of a power generation system 10, a gas turbine engine, having a compressor section 12, a combustor section 14 and a turbine section 16. In turbine section 16, there are alternating rows of stationary airfoils 18 (commonly referred to as vanes) and rotating airfoils 20 (commonly referred to as blades). Each row of blades 20 is formed by a plurality of airfoils 20 attached to a disc 22 provided on a rotor 24. Blades 20 can extend radially outward from discs 22 and terminate in a region known as a blade tip 26. Each row of vanes 18 is formed by attaching plurality of vanes 18 to a vane carrier 28. Vanes 18 can extend radially inward from the inner peripheral surface 30 of vane carrier 28. Vane carrier 28 is attached to an outer casing 32, which encloses turbine section 16 of engine 10. During operation of power generation system 10, high temperature and high velocity gases flow through rows of vanes 18 and blades 20 in turbine section 16.

FIG. 2 is a perspective view of a ceramic matrix composite (CMC) component 100 of power generation system 10 after tooling. In one embodiment, component 100 is, but not limited to, gas turbine engine components, including combustor components, high pressure turbine vanes and blades, and other hot section components, such as but not limited to, airfoils, vanes, ceramic box shrouds and nozzle applications. As shown in FIGS. 2-3, the CMC component 100 is a blade 20. Component 100 includes a ceramic foam core 120 and a ceramic matrix composite (CMC) material 130 surrounding at least a portion of ceramic foam core 120. Ceramic foam core 120 remains in place during operation of CMC component 100 in power generation system 10. Ceramic foam core 120 is formed from a material that withstands the CMC curing process and becomes a part of the final CMC component 100.

In one embodiment, the material for the ceramic foam core 120 includes, but is not limited to, mullite, silica, zironica, zircon, and combinations thereof In another embodiment, the ceramic foam core 120 is constructed from silicon carbide (SiC) or silicon boron (SiB) materials using a mold. The mold provides the desired geometry for ceramic foam core 120. Ceramic foam core 120 is an open cell foam core or a closed cell foam core.

CMC component 100 includes an oxide based CMC such as AN-720 (oxide-oxide based), which is available from COI Ceramics, Inc., San Diego, Calif., or a hybrid oxide CMC material such as the ones disclosed in U.S. Pat. No. 6,733, 907, which is incorporated herein by reference in its entirety.

As shown in FIG. 3, component 100 is blade 20 having a leading edge 152, a trailing edge 150 and a stem portion 156. CMC material 130 of blade 20 surrounds at least a portion of ceramic foam core 120. In one embodiment, CMC material 130 completely surrounds ceramic foam core 120. The sidewalls 160 of the CMC material 130 are adjacent to the ceramic foam core 120 and generally joined by ceramic foam core 120 (see FIG. 4). Ceramic foam core 120 provides additional stiffness or stability to CMC component 100 by forming unitary CMC component 100. Additionally, ceramic foam core 120 provides improved vibration properties.

In one embodiment, ceramic form core 120 functions as a mandrel in fabricating CMC component 100. Ceramic foam core 120 receives or is wrapped by the reinforcing fibers 132. Reinforcing fibers 132 are arranged and disposed to form blade 20. Reinforcing fibers 132 include uniaxial and or biaxial oriented material as well as general materials, such as, but not limited to quadraxial oriented materials, none crimp fabric (NCF), chopped strand mat, and knitted fabrics.

As shown in FIG. 4, one embodiment of providing CMC material 130 uses reinforcing fibers 132 impregnated with a matrix material 134 and further processed to form CMC material 130. In an alternative embodiment, CMC material 130 is constructed from a pre-preg CMC material.

As shown in the enlarged view in FIG. 4, pre-processed CMC material 130 of CMC component 100 includes a ceramic matrix 134 and at least one reinforcing layer 133 comprising a plurality of reinforcing fibers 132 (only a few fibers are shown in FIG. 4 to facilitate discussion) within the matrix 134 and an optional intermediate layer 138 applied to ceramic foam core 120. The intermediate layer 138 is a laminate layer constructed from CMC plies. Reinforcing fibers 132 are selected from materials such as metallic fibers, ceramic fibers, carbon fibers, and combinations thereof Additionally, as shown in FIG. 4, CMC material 130 can optionally include intermediate layer 138 applied to ceramic foam core 120 prior to application of the plurality of reinforcing fibers 132. CMC material 130 includes any suitable fiber architecture. Reinforcing fibers 132 of CMC 130 can be oriented to provide the desired strength properties. For instance, reinforcing fibers 132 can be oriented to provide anisotropic, orthotropic, or in-plane isotropic properties. In one embodiment, reinforcing fibers 132 can be arranged at substantially 90 degrees relative to each other, such as a 0-90 degree orientation or a +/−45 degree orientation. Reinforcing fibers 132 can also be provided in multiple layers or laminate plies 136. In one embodiment, reinforcing fibers 132 are pre-impregnated before application. Ceramic matrix 134 is selected from materials such as SiC, SiN, SiB, and combinations thereof In one embodiment, conventional ceramic matrix material processing is used to arrive at CMC component 100. During processing, ceramic foam core 120 does not melt out of CMC component 100. Even after the burn or rigidizing cycle, ceramic foam core 120 remains. In one embodiment, high temperature CMC SiC foam is used for ceramic foam core 120. During the burn out cycle, which is when preformed component 500 (see FIGS. 4-5) is placed in an oven at preset temperature to get rid of all the binders in CMC material 130 (volatile gasses) to form CMC component 100, both CMC material 130 (or preformed parts 32 and 34) and ceramic foam core 120 undergo a transition that burns away all volatile substances, such as silicon. After the burn-out stage or cycle, the resulting CMC component 100 has CMC material 130 and ceramic foam core 120 of comprising mainly carbon. Ceramic foam core 120 is situated between sidewalls 160 of CMC material 130. The resulting CMC component 100, including both CMC material 130 and ceramic foam core 120 include a fragile porous carbon material having a toast-like texture or structure.

Figure 5:
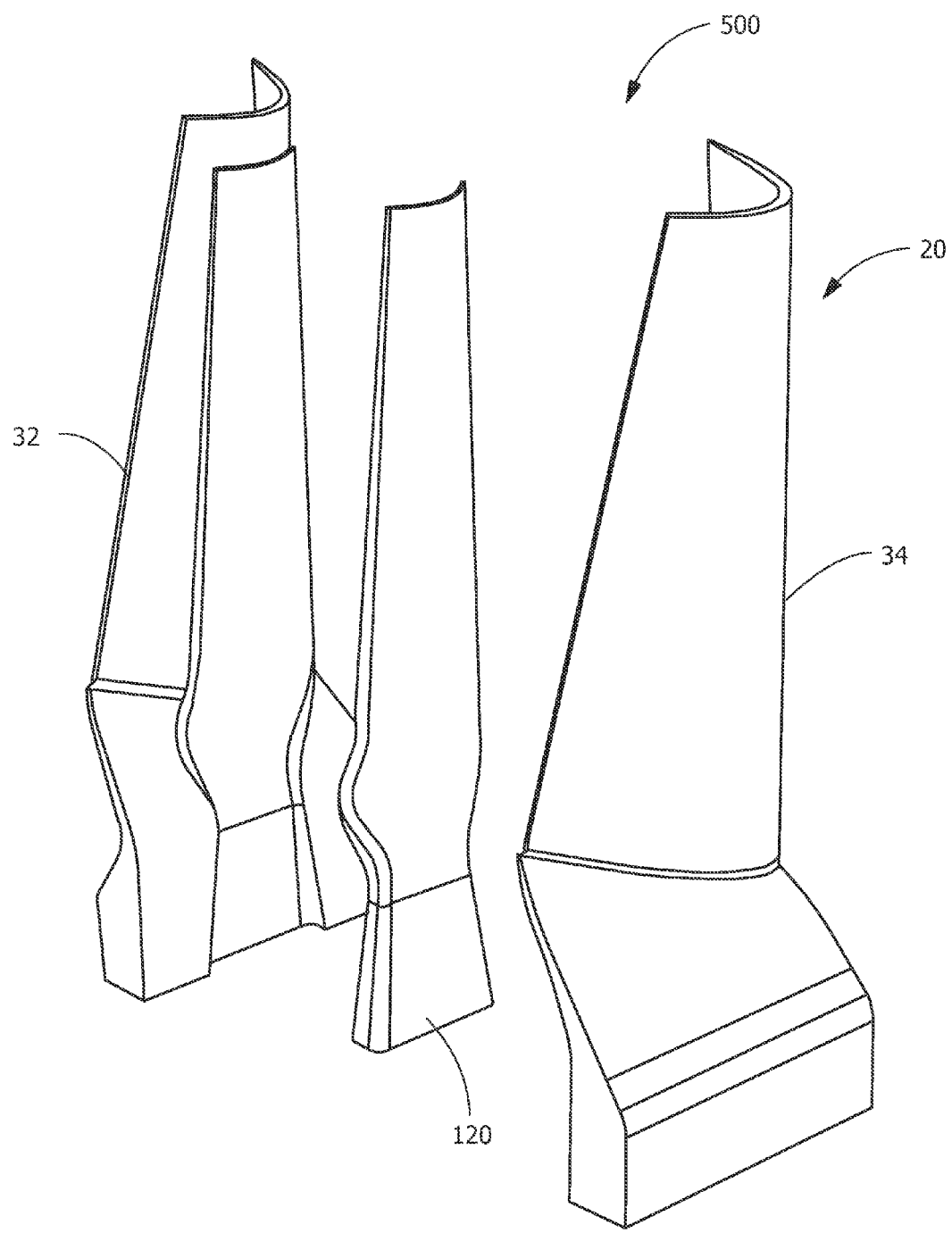
FIG. 5 is an exploded view of the preformed CMC component including a ceramic foam core, prior to tooling.

As shown in FIG. 5, in an alternative embodiment, CMC component 100 is formed using preformed CMC component 500. Preformed CMC component 500, here a pre-processed blade 20, is formed from pressure side part 32 and suction side part 34 surrounding ceramic foam core 120. CMC material 130 that is used to create parts 32 and 34 is created using a laminate sequence of CMC plies in different combinations and thicknesses depending on the component to be produced. Additionally, parts 32 and 34 include the necessary strength characteristics depending on the structure of the final component 100. The parts 32 and 34 can include a final matrix ply on the outside of part.

Figure 6:
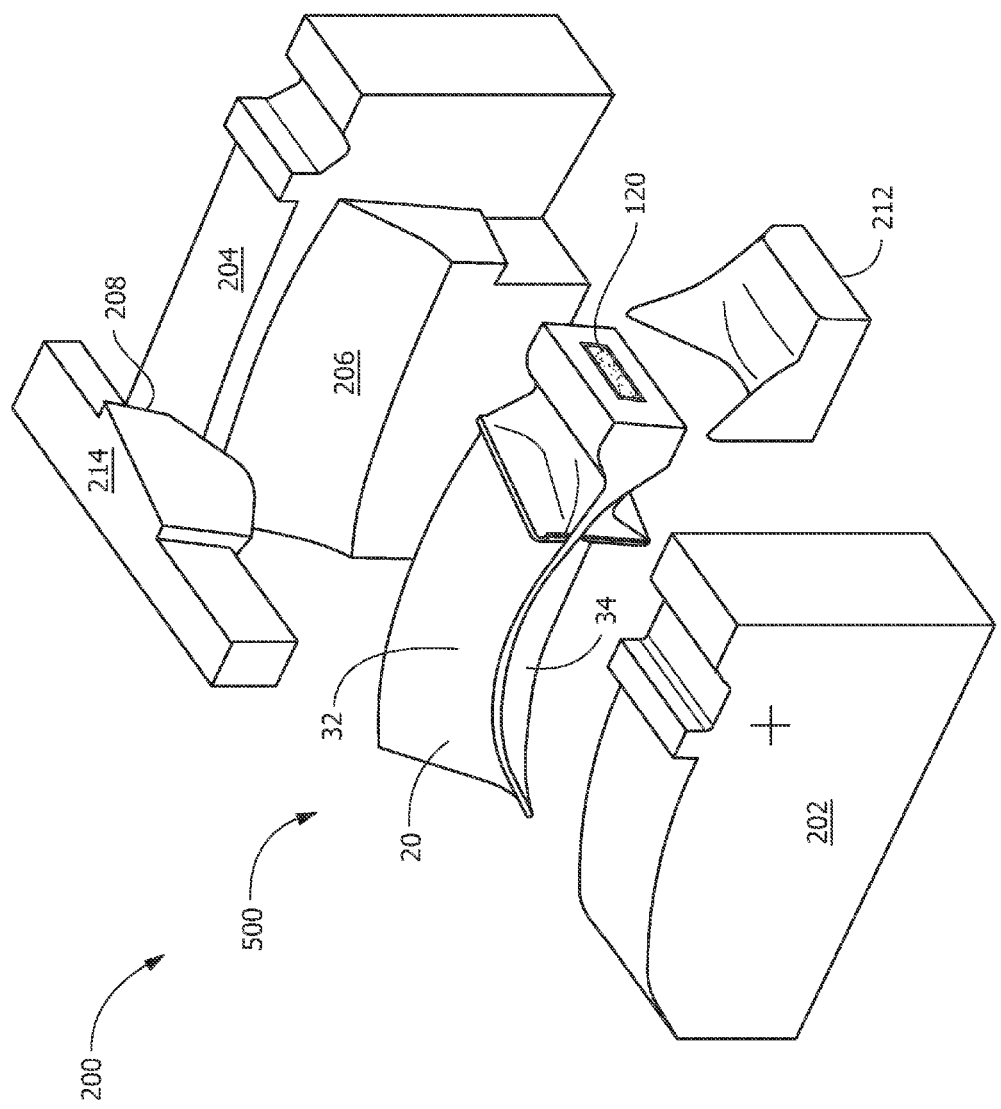
FIG. 6 shows a perspective view of an exemplary embodiment of tool used to make blade assemblies.

As shown in FIG. 6, tool 200 can be used for fabricating CMC component 100 including the ceramic foam core 120 surrounded by pressure side preform 32 and suction side preform 34. A pre-form blade 20, such as the one in FIG. 5 is situated or laid-up in tool 200 for rigidizing or densify the composite. Generally, tool 200 includes a first set of opposing sides 202, 204 configured to abut each other and be fastened together. As shown, sides 202, 204 can be arranged as a mold for component 100 or a section for holding the blade surrogate. Sides 202, 204 can include a first layup surface 206 designed to permit fabrication of the desired shape for blade 10. Tool 200 further includes a second set of opposing sides 208, 210 configured to provide pressure on airfoil and dovetail, respectively (or, in the alternate embodiments, on the blade surrogate). Tool 200 may include a dovetail die 212 and/or a bridge 214 or other structures to provide a selectively configurable surface for laying up preform material, such as ceramic fiber material. In one embodiment, the dovetail die 212 may further define a layup surface, for example the first layup surface. In another embodiment, the dovetail die 212 is configured for the airfoil and dovetail preform and the integral platform preform to be co-rigidized.

Next, a Melt Infiltration (MI) process is used to complete the construction of CMC component 100. A silicon boron material, such as tetraboride ($SiB_4$), silicon hexaboride ($SiB_6$), or combinations thereof, is melted into CMC component 100 including ceramic foam core 120 and CMC material 120 using a wicking, gating, or other suitable process. During the MI process, the silicon boron material is absorbed by capillary absorption into all the carbon cavities that exist in CMC component 100 and ceramic foam core 120.

Figure 7:
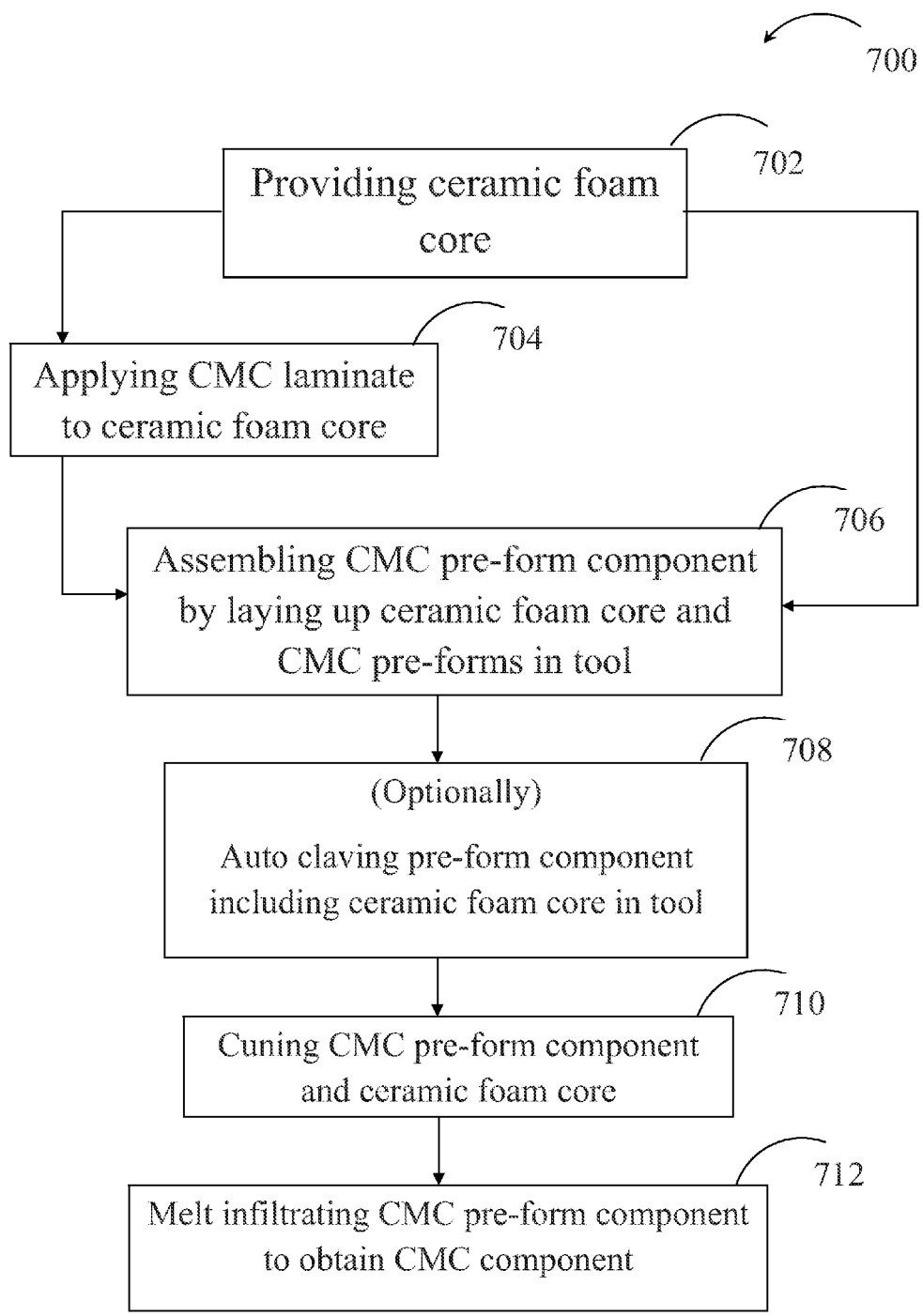
FIG. 7 is a flow chart of the method of forming the component of the present disclosure.

A method 700 of forming a ceramic matrix composite component 100 is shown in FIG. 7. The method 700 includes providing a ceramic foam core 120, step 702 (see FIG. 2). In one embodiment, the ceramic foam core 120 has a predetermined geometry and operates as a mandrel for forming the component 100. Next, optionally, an intermediate layer 138, or CMC laminate is applied to the ceramic foam core 120, step 704 (see FIG. 4). Next, the CMC pre-form 500 is assembled in a tool 200 (see FIG. 6) by surrounding the ceramic foam core 120 with pressure side preform 32 and suction side preform 34, step 706 (see FIGS. 5-6). Alternatively, a plurality of reinforcing layers 133 are applied to the ceramic foam core 120 in tool 200, step 706 (see FIGS. 4 and 6) to arrive at the desired preform component shape. In one embodiment, the reinforcing layer 133 is impregnated with a matrix material 134 or the fibers are pre-impregnated before application. Next, the preform component 500, including ceramic foam core 120 is optionally autoclaved using tool 200, step 708. Next, preform component 500 including ceramic foam core 120 are cured at a suitable temperature, such as, but not limited to, approximately 2700° F. to approximately 3400° F. or alternatively approximately 2750° F. to approximately 3300° F. or alternatively approximately 2800° F. to approximately 3200° F., step 710. Curing rigidizes the preform component 500 and ceramic foam core 120 and burns off excess organic materials and leaves a fragile porous carbon material having an almost toast-like texture or structure and having the general desired shape of the component 100. Next, the preform component and ceramic foam core 120 are densified by using melt infiltration or other suitable wicking techniques with silicon boron materials to form the CMC component 100, step 712 (see FIG. 2).

One advantage of an embodiment of the present disclosure includes a method that does not require the additional removal steps and cleaning steps associated with forming CMC components.

Another advantage of an embodiment of the present disclosure includes a method that eliminates cleaning and re-melting of mandrels used in forming the CMC components.

Another advantage of an embodiment of the present disclosure is that the component remains lightweight and hollow while permitting gas flow or pressurization of the internal cavity of the component.

Yet another advantage of an embodiment of the present disclosure is that the component has unified sidewalls providing a complete unitary structural system thereby improving vibration and stiffness similar to a solid CMC blade with a weight reduction.

Yet another advantage of an embodiment of the present disclosure is that it reduces laminate build time and ply assembly thereby driving down cost.

Yet another advantage of an embodiment of the present disclosure is reduced CMC blade weight and lower centrifugal loads thereby allowing for a reduction in size and weight of rotors that receive the CMC blades.

Another advantage includes reduced blade weight compared to a solid monolithic component.

Another advantage of an embodiment of the present disclosure is that component has improved stiffness properties over a hollow CMC component.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite component for a power generation system comprising:
   a ceramic foam core;
   a ceramic matrix composite material surrounding at least a portion of the ceramic foam core, the ceramic matrix composite material comprising at least one reinforcing fiber and a matrix material; and
   a silicon boron material melt infiltrated into the ceramic foam core and the ceramic matrix composite material;
   wherein the ceramic foam core remains in place during operation of the component.

2. The ceramic matrix composite component of claim 1, wherein the ceramic foam core includes a material selected from alumina, mullite, silica, zirconia, zircon, silicon carbon, silicon boron, and combinations thereof.

3. The ceramic matrix composite component of claim 2, wherein the ceramic foam core is selected from an open cell foam or a closed cell foam.

4. The ceramic matrix composite component of claim 1, wherein the at least one reinforcing fiber includes material selected from metallic fibers, ceramic fibers, carbon fibers, and combinations thereof.

5. The ceramic matrix composite component of claim 1, wherein the matrix material selected from SiC, SiN, and combinations thereof.

6. The ceramic matrix composite component of claim 1, wherein an intermediate layer is adjacent to the ceramic foam core and adjacent to the ceramic matrix composite material.

7. The ceramic matrix composite component of claim 1, wherein the ceramic foam core and the ceramic matrix composite material form a unitary ceramic matrix composite component.

8. The ceramic matrix composite component of claim 1, wherein a leading edge, a trailing edge, and a stem portion of the ceramic matrix composite component surround the portion of the ceramic foam core.

9. The ceramic matrix composite component of claim 8, wherein the ceramic foam core surrounded by the leading edge and the trailing edge is exposed through the stem portion of the ceramic matrix composite component.

10. The ceramic matrix composite component of claim 1, wherein the at least one reinforcing fiber comprises a chopped strand.

11. The ceramic matrix composite component of claim 1, wherein the at least one reinforcing fiber is selected from the group consisting of uniaxial oriented material, biaxial oriented material, quadraxial oriented materials, non-crimp fabric (NCF), chopped strands, knitted fabrics, and combinations thereof.

12. The ceramic matrix composite component of claim 1, wherein the ceramic foam core increases a stiffness of the ceramic matrix composite.

13. The ceramic matrix composite component of claim 1, wherein the ceramic foam core increases a stability of the ceramic matrix composite.

14. The ceramic matrix composite component of claim 1, wherein the at least one reinforcing fiber is arranged and disposed to form the ceramic matrix composite component.

15. A power generation system comprising:
   a turbine having a blade comprising:
      a ceramic foam core;
      a ceramic matrix composite material surrounding at least a portion of the ceramic foam core, the ceramic matrix composite material forming a leading edge, a trailing edge, and a stem portion of the blade; and
      a silicon boron material melt infiltrated into the ceramic foam core and the ceramic matrix composite material; wherein the ceramic foam core remains in place within the leading edge, the trailing edge, and the stem portion, during operation of the component in the power generation system.

16. The power generation system of claim 15, wherein the ceramic foam core includes a material selected from alumina, mullite, silica, zirconia, zircon, silicon carbon, silicon boron and combinations thereof.

17. The power generation system of claim 15, wherein the ceramic foam core is selected from an open cell foam or a closed cell foam.

18. The power generation system of claim 15, wherein an intermediate layer is adjacent to the ceramic foam core and adjacent to the ceramic matrix composite material.

19. The power generation system of claim 15, wherein the ceramic matrix composite material includes reinforcing layer selected from metallic fiber, ceramic fiber, carbon fiber, and combinations thereof.

20. The power generation system of claim 15, wherein the ceramic matrix composite material includes a matrix material selected from SiC, SiN, and combinations thereof.

* * * * *